United States Patent
Ichi et al.

(10) Patent No.: US 7,261,904 B2
(45) Date of Patent: Aug. 28, 2007

(54) PURIFIED COCHINEAL AND METHOD FOR ITS PRODUCTION

(75) Inventors: Takahito Ichi, Toyonaka (JP); Takatoshi Koda, Toyonaka (JP); Chiyoki Yukawa, Toyonaka (JP); Makoto Sakata, Toyonaka (JP); Hiroyuki Sato, Toyonaka (JP)

(73) Assignee: San-Ei Gen F.F.I. Inc., Toyonaka-shi (JP)

( * ) Notice: Subject to any disclaimer, the term of this patent is extended or adjusted under 35 U.S.C. 154(b) by 501 days.

(21) Appl. No.: 10/428,995

(22) Filed: May 5, 2003

(65) Prior Publication Data

US 2003/0199019 A1   Oct. 23, 2003

Related U.S. Application Data

(60) Division of application No. 09/953,826, filed on Sep. 19, 2001, now abandoned, which is a continuation of application No. PCT/JP01/02310, filed on Mar. 23, 2001.

(30) Foreign Application Priority Data

Sep. 11, 2000 (JP) ............... 2000-274596

(51) Int. Cl.
 *A61K 35/64* (2006.01)
 *C12P 1/00* (2006.01)

(52) U.S. Cl. .................................... 424/538; 435/41

(58) Field of Classification Search .......... None
See application file for complete search history.

(56) References Cited

U.S. PATENT DOCUMENTS

| 5,147,673 | A | 9/1992 | Schul .................. 426/250 |
| 5,164,212 | A | 11/1992 | Nafisi-Novaghar et al. . 426/250 |
| 5,509,941 | A | 4/1996 | Gurley .................. 8/625 |
| 6,500,473 | B1 | 12/2002 | Koehler et al. ............ 426/89 |

FOREIGN PATENT DOCUMENTS

| JP | 46-11115 | 3/1971 |
| JP | 53-060934 | 5/1978 |
| JP | 53-071128 | 6/1978 |
| JP | 56-139561 | 10/1981 |
| JP | 07-241181 | 9/1995 |
| JP | 08-283600 | 10/1996 |
| WO | WO98/12209 | 3/1998 |

OTHER PUBLICATIONS

Merino et al., J. Association Official Analytical Chemists International 80 (5) : 1044-51 (1997).*
Lloyd, "Extraction and Chemistry of Cochineal", Food Chemistry 5 : 91-107 (1980).*
Lloyd, A.G.; "Extraction and Chemistry of Cochineal"; *Food Chem* 5; Applied Science Publishers, Ltd. England (1980) pp. 91-107.
Kume, Akihiro et al.; "A case of type I allergy due to cochineal extract"; *Environ Dermatel 6*; Department of Dermatology, Sakai Municipal Hospital, Osaka, Japan (1999) pp. 148-152.
Lizaso, M.D., M.T. et al.; "Identification of allergens involved in occupational asthma due to carmine dye"; *Annals of Allergy, Asthma & Immunology*, vol. 84, May (2000); pp. 549-552.
Sakata et al., "Chemical properties of carminic acid from the view point of dyeing," Nippon Sanshigaku Zasshi 67(2):117-122.
Sugimoto et al., "Structures of minor pigments in the cochineal dye," Natural Medicine (Tokyo) 52(2): 135-139(1998).
Nishizawa et al., "Analysis of natural dyes. III. Analysis of cochineal dye and lac dye in foods and dyes," Hokkaidoritsu Eisel Dendyushoho 35:7-11(1985).
Chinese Office Action dated Mar. 11, 2005 and English Translation.

* cited by examiner

*Primary Examiner*—Sandra E. Saucier
(74) *Attorney, Agent, or Firm*—Kratz, Quintos & Hanson, LLP

(57) ABSTRACT

The invention provides a cochineal color, a colorant product containing the cochineal color and the method of its production, wherein the cochineal color is free of allergenic proteins and contaminants derived from the raw material *Coccus cacti* L. insect and can be added with safety to products taken by mouth, such as foods, pharmaceutical products, etc. The invention relates to a cochineal color substantially free of proteins of molecular weight not less than 6000. The invention also relates to a process for producing a cochineal color which comprises subjecting a cochineal extract solution to proteolysis and then to at least one treatment selected from the group consisting of adsorption treatment, ion exchange treatment, acid treatment, extraction treatment and membrane treatment.

10 Claims, 1 Drawing Sheet

US 7,261,904 B2

PURIFIED COCHINEAL AND METHOD FOR ITS PRODUCTION

CROSS REFERENCE TO RELATED APPLICATION

This application is a division of Serial No. 09/953,826, filed Sep. 19, 2001, now abandonded which is a continuation of prior International Application Ser. No. PCT/JP01/02310, filed Mar. 23, 2001.

TECHNICAL FIELD

This invention relates to the cochineal color characterized by its being so pure as to be substantially allergen-free and to a coloring composition comprising the color. Furthermore, this invention relates to a method of producing said cochineal color of high purity and free of allergens.

BACKGROUND ART

Cochineal in broad use as a coloring agent, for example in pharmaceutical products and foods, is derived from the red coloring matter occurring in the female insect bodies of *Coccus cacti* L. which grows on *Nopalea coccinellifera* and other plants of the family Cactaceae cultivated in the desert areas of Mexico and Central and South America. As such, cochineal is harvested from said insect by extracting its dried bodies with water or alcohol.

It has been reported, of late, that being an insect-derived substance, cochineal contains allergenic impurity proteins and as such may be an etiologic factor in allergic diseases (*Ann Allergy Asthma*, Vol. 84(5), 549–552, 2000.).

Further, the use of cochineal colors produced by conventional methods poses problems that the types and applications of the products, and the usage concentration of the color are limited due to the odors probably attributable to the above raw material. Another problem is also pointed out that the conventional cochineal colors tend to form a sediment with time since they contain proteins and like contaminants derived from the above raw material.

DISCLOSURE OF INVENTION

The inventors of this invention made an intensive investigation to overcome the above allergenicity problem of the conventional cochineal colors and have come to develop the cochineal colors defined below.

This invention, therefore, is directed to the following purified cochineal colors (1) and (2).

(1) A purified cochineal color characterized by its being substantially free of the *C. cacti* L. insect-derived allergens.

(2) A purified cochineal color as defined in paragraph (1) further characterized by its being substantially free of proteins of molecular weight not less than 6000.

This invention is further directed to the following color compositions and associated colorant product (3)~(5). (3) A color composition comprising the purified cochineal color defined in paragraph (1) and a food sanitation-wise or pharmaceutically acceptable carrier or additive.

(4) A color composition as defined in paragraph (3) wherein the cochineal color is at least one member selected from the group consisting of carminic acid, carminic acid aluminum lake, carminic acid calcium lake, and a polymer of carminic acid aluminum lake or carminic acid calcium lake.

(5) A colorant product for application to foods, pharmaceutical preparations, quasi-drug preparations or cosmetic products which comprises the color composition defined in paragraph (3).

The invention is further directed to the following processes (6)~(16) for producing a cochineal color.

(6) A process for producing a cochineal color which comprises subjecting a cochineal extract solution to proteolysis and removing a fraction of molecular weight not less than 6000.

(7) A process for producing a cochineal color which comprises subjecting the cochineal extract solution to proteolysis and then to at least one treatment selected from the group consisting of adsorption treatment, ion exchange treatment, acid treatment and membrane treatment.

(8) A process for producing a cochineal color which comprises subjecting the cochineal extract solution to proteolysis and adsorption treatment and then to at least one treatment selected from the group consisting of adsorption treatment, ion exchange treatment, acid treatment and membrane treatment.

(9) A process for producing a cochineal color as defined in paragraph (6) wherein the cochineal extract solution is an extracted product obtained from the *Coccus cactus* L. insect with use of an aqueous alcohol.

(10) A process for producing a cochineal color as defined in paragraph (6) wherein the cochineal extract solution is subjected to proteolysis under an acidic condition.

(11) A process for producing a cochineal color as defined in paragraph (7) or (8) wherein the adsorption treatment is carried out under an acidic condition.

(12) A process for producing a cochineal color as defined in paragraph (7) or (8) wherein the adsorption treatment comprises adsorbing cochineal color on an adsorbent under an acidic condition and desorbing it with an aqueous alcohol under a condition of pH 7~9.

(13) A process for producing a cochineal color as defined in paragraph (7) or (8) wherein the acid treatment is conducted with an acid used as a food additive.

(14) A process for producing a cochineal color as defined in paragraph (7) or (8) wherein the membrane treatment is at least one treatment selected from the group consisting of reverse osmosis membrane treatment, nanofiltration membrane treatment, ultrafiltration membrane treatment and microfiltration membrane treatment.

(15) A process for producing a cochineal color as defined in paragraph (7) or (8) wherein the membrane treatment is at least one treatment selected from the group consisting of reverse osmosis (RO) membrane treatment, membrane filter (MF) treatment, ultrafiltration (UF) membrane treatment and nanofiltration (NF) membrane treatment.

(16) A process for producing a cochineal color as defined in paragraph (7) or (8) wherein the membrane treatment is carried out using a membrane having a cut-off molecular weight of 2000~8000.

(17) A process for producing a cochineal color as defined in paragraph (7) or (8) wherein a fraction of molecular weight not less than 6000 is removed by the membrane treatment.

BEST MODE FOR CARRYING OUT THE INVENTION

Figure 1:
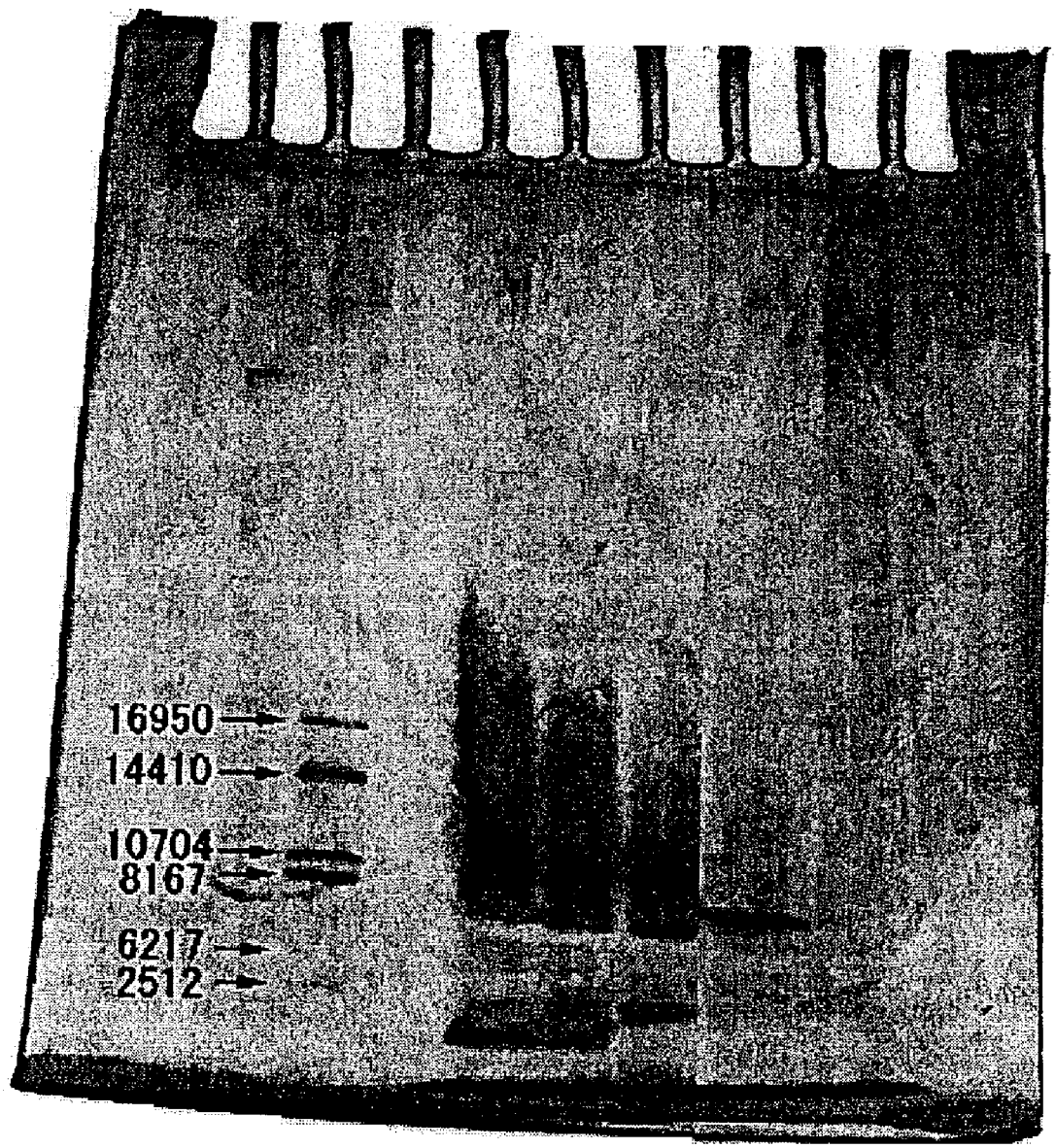
FIG. 1 is an SDS-polyacrylamide gel electrophoretogram (SDS-PAGE) of the liquors in various production stages. The lanes, from left to right, represent ① molecular weight markers (16950Da, 14410Da, 10704Da, 8167Da, 6217Da, 2512Da), ② cochineal extract solution, ③ protein hydrolysate, ④ adsorption-treated solution, ⑤ MF filtrate, and ⑥ NF filtrate.

This invention relates to a cochineal color derived from *Coccus cacti* L. and characterized by its being substantially allergen-free.

Cochineal is generally a red coloring matter composed predominantly of carminic acid which is an anthraquinone color and, as mentioned above, is produced by a process starting with *Coccus cacti* L.

The cochineal color of the invention has been purified, for implementing the above feature, to a degree substantially not containing proteins of molecular weight not less than 6000.

The cochineal color of the invention as such can be produced by a technology which comprises using a cochineal extract solution obtained by extracting *C. cacti* insect bodies with a suitable solvent, subjecting said cochineal extract solution to proteolysis and, then, to a suitable purification treatment such as ion exchange treatment and/or membrane treatment to remove a fraction of molecular weight not less than 6000 from the cochineal extract.

More particularly, a highly purified cochineal color according to the invention can be produced and acquired by subjecting the liquor after proteolysis of a cochineal extract solution to any one of adsorption treatment, ion exchange treatment, acid treatment or membrane treatment or an arbitrary combination of any two or more of said treatments.

The cochineal extract solution for use in the present invention can be obtained by advantageously comminuting the dried *C. cactis* L. insect bodies and extracting the powder with water, an alcohol or an aqueous alcohol. The alcohol includes lower alcohols containing 1~4 carbon atoms, such as methanol, ethanol, propanol, isopropyl alcohol and butanol. The preferred is ethanol.

The method of extraction may be one in routine use for extraction. Thus, the extraction method includes but is not restricted to a method which comprises soaking the dry powder of *C. cactis* L. bodies in said solvent by a cold extraction technique or a warm extraction technique, a method comprising extracting said powder under warming and stirring and filtering the same, and a percolation method. The preferred technique comprises immersing the dry powder of *C. cacti* L. insect bodies in a solvent, preferably prewarmed, for several minutes through a few hours, preferably for tens of minutes. The pH of the extractant solvent is not particularly restricted but is preferably neutral~alkaline, specifically pH 6~8, preferably pH 7~8, more preferably about pH 7.5. The basic compound to be used for alkalinizing the extractant solvent can be selected from a broad range of compounds which can be used in foods and is not particularly restricted otherwise. As typical examples, sodium hydroxide, sodium carbonate, sodium hydrogencarbonate and sodium citrate can be mentioned.

The cochineal extract solution obtained in the above manner is filtered, coprecipitated or centrifuged to remove a solid fraction where necessary and, then, subjected to proteolysis either as it is or after concentration. The proteolysis can be generally effected by means of an enzyme.

The enzyme for use in the proteolysis is not particularly restricted insofar as it is capable of digesting protein or peptides. Expediently, enzyme preparations commercially available as proteases or peptidases can be employed. The enzymatic proteolysis can be carried out under specific conditions suited to the respective enzymes. For the enzymatic treatment under acidic conditions, for instance, said cochineal extract solution is preferably adjusted to pH 3~5, preferably pH 3.5~4.5, using an inorganic acid such as hydrochloric acid, sulfuric acid or phosphoric acid or an organic acid such as citric acid, malic acid, tartaric acid, lactic acid, acetic acid or fumaric acid. The temperature for this proteolysis is not particularly restricted but may generally be within the range of 30~60° C.

The protein hydrolysate thus obtained is subjected to filtration, coprecipitation or centrifugation for removal of the precipitate formed where necessary and, either directly or after concentration, is further subjected to adsorption treatment, ion exchange treatment, acid treatment or membrane treatment. The preferred is membrane treatment.

The filtration procedure for removal of the precipitates formed in the various stages in the process according to the invention, inclusive of the precipitate mentioned just above, can be carried out in the presence of a filter aid, such as diatomaceous earth or celite, the use of which enables removal of fine particles which are not easy to filter off.

The adsorption treatment can be carried out in the routine manner. For example, it may be an adsorption treatment using such an adsorbent as activated carbon, silica gel or a porous ceramic material or an adsorption treatment using an adsorbent resin as follows: a styrenic adsorbent resin such as Duolite S-861 (TM, Diamond Shamrock, U.S.A.; the same applies below), Duolite S-862, Duolite S863 and Duolite S-866; an aromatic adsorbent resin such as Sepabeads SSP700 (TM, Mitsubishi Chemical; the same applies below), Sepabeads SP825, Diaion HP10 (TM, Mitsubishi Chemical; the same applies below), Diaion HP20, Diaion HP21, Diaion HP40 and Diaion HP50, etc.; and Amberlite XAD-4 (TM, Organo; the same applies below), Amberlite XAD-7 and Amberlite XAD-2000, etc., for instance.

The adsorption treatment is carried out preferably, but not essentially, under acidic conditions. To be specific, the sample to be adsorbed is preferably adjusted to pH above 2~4, more preferably pH about 3, with said inorganic or organic acid.

The cochineal color adsorbed on the adsorbent can be recovered by desorbing (eluting) it with a suitable solvent such as an aqueous alcohol. Preferably, prior to elution, the adsorbent is washed with a suitable solvent, such as water, which does not cause desorption of the cochineal color. The preferred aqueous alcohol generally contains 10~60% by volume, more preferably 20~80% by volume, of an alcohol. The alcohol includes lower alcohols of 1~4 carbon atoms, such as methanol, ethanol, propanol, isopropyl alcohol and butanol. The preferred alcohol is ethanol.

In this case, the desorbing solvent or eluent is preferably neutral~alkaline, namely pH 7~9, preferably pH 8~9, and the adjustment to such a pH level can be made using sodium citrate, sodium hydroxide, sodium carbonate, sodium hydrogencarbonate or the like.

The liquor available on adsorption treatment of the cochineal extract solution can be subjected to a further adsorption treatment or to any of various other treatments such as ion exchange treatment, membrane treatment and acid treatment.

This adsorption treatment may be the same treatment as described above.

The ion exchange treatment is not particularly restricted but includes the routine cation exchange or anion exchange treatment using the conventional ion exchange resin. The cation exchange resin, for instance, includes but is not restricted to strongly cation exchange resins and weakly cation exchange resins, such as Diaion SK1B (TM, Mitsubishi Chemical; the same applies below), Diaion SK102, Diaion SK116, Diaion PK208, Diaion WK10 and Diaion WK20, among others. The anion exchange resin is not particularly restricted, either, but includes Diaion SA10A (TM, Mitsubishi Chemical; the same applies below), Diaion SA12A, Diaion SA20A, Diaion PA306, Diaion WA10, and Diaion WA20, among others.

The membrane treatment in the context of the present invention means a variety of filtration treatments using membranes, thus including a treatment with a membrane filter (MF), a functional high polymer membrane such as an ultrafiler (UF), a nanofilter (NF), a reverse osmosis (RO) filter or an electrodialysis membrane.

The known membrane treatment technology includes not only the UF and RO membrane methods but also the dialysis treatment utilizing the concentration gradient across an ion-selective membrane and the electrodialysis treatment using an ion exchange membrane with application of a voltage, among others. Industrially, the NF membrane filtration method is preferred. The membrane material for use in the membrane treatment method may be natural, synthetic or semisynthetic and includes cellulose, cellulose diacetate or triacetate, polyamides, polysulfones, polystyrenes, polyimides and polyacrylonitrile, among others.

The membrane treatment according to the invention includes a treatment by which high molecular compounds are removed with a membrane having a cut-off molecular weight of, for example, 10000~1000000 and a treatment by which low molecular compounds are removed with a membrane having a cut-off molecular weight of about 2000~8000, preferably about 6000, more preferably about 3000.

The former technology specifically includes the UF membrane technique using any of NTU-3150 membrane, NTU-3250 membrane, NTU-3550 membrane and NTU-3800 UF membrane (all available from Nitto Denko Corporation); Cefilt-UF (product of Nippon NGK Insulators, Ltd.); AHP-2013 membrane, AHP-3013 membrane and AHP-1010 membrane (all available from Asahi Chemical Industry), among others. The later technology includes the reverse osmosis membrane (NF membrane; cut-off mol. wt. ca 3000) technique using any of NTR-7250 membrane, NTR-7410 membrane, NTR-7430 membrane and NTR-7450 membrane (all from Nitto Denko Corporation); AIP-3013 membrane; ACP-3013 membrane, ACP-2013 membrane, AIP-2013 membrane and AIO-1010 membrane (all available from Asahi Chemical Industry), among others. These membranes can be used each independently or in a suitable combination.

The acid treatment can be effected by adjusting the protein hydrolysate of a cochineal extract solution or the liquor subjected to the various treatments mentioned above to pH 1~6, preferably pH 1.5~4, to thereby expose the liquor to an acidic environment. The acid treatment can be expediently carried out by adding an acid to said liquor. The acid to be used is not particularly restricted insofar as it is in routine use as a food additive and can be arbitrarily selected from among such acids. For example, such organic acids as citric acid, acetic acid, malic acid, lactic acid, etc. and such inorganic acids as sulfuric acid, hydrochloric acid, phosphoric acid, nitric acid, etc. can be employed. The preferred) is a treatment using an inorganic acid which is in routine use as a food additive.

The temperature condition for said acid treatment is not particularly restricted but usually can be arbitrarily selected from the range of 5~100° C. For example, the range of 20~100° C. or the range of 40~100° C. may be used. The duration of acid treatment is not particularly restricted but usually can be arbitrarily selected from the range of 1~300 minutes. Generally speaking, a shorter treatment time suffices at a high treatment temperature and, in this sense, the treatment time at 40~100° C., for instance, may be selected from the range of 5~60 minutes. In this treatment, the treatment load liquor may optionally be agitated, there being no particular rule to be complied with.

As an optional treatment, carbon dioxide gas, ethylene, propane or the like may be contacted with the protein hydrolysate of a cochineal extract solution or said liquor after said adsorption treatment under supercritical temperature and pressure conditions in a hermetically closed system.

Only one of the above treatments may be carried out or two or more of them may be carried out in an optional combination in an arbitrary order. Or one and the same treatment may be carried out repeatedly under the same or varied conditions.

The preferred treatment method, though it is not particularly restricted, comprises subjecting the cochineal extract after proteolytic treatment to an adsorption treatment and subjecting the liquor obtained by desorption from the adsorbent to a membrane treatment. Furthermore, where necessary, an ion exchange treatment may be carried out after said adsorption treatment. The membrane treatment mentioned above is preferably an MF, UF or NF membrane treatment, more preferably an MF or NF membrane treatment. Furthermore, this membrane treatment is preferably carried out using a membrane having a cut-off molecular weight of 2000~8000, preferably about 6000, more preferably about 3000, to thereby remove high molecular compounds, preferably those having molecular weights over 6000, more preferably over 3000.

The cochineal color of the present invention, thus obtained, has been effectively deprived of various contaminants inclusive of the *C. cacti* L. insect-derived proteins which are allergenic or potentially allergenic. There can, thus, be provided a cochineal color which, when formulated in foods, pharmaceuticals, quasi drugs or cosmetic products which are, or are liable to be, taken by mouth, does not induce allergic responses. Furthermore, the cochineal color obtained by the above method of the invention scarcely forms a precipitate with time, thus enjoying a good shelf-life.

Incidentally, the term "cochineal color" means carminic acid in the main but the cochineal color in the context of the invention includes not only carminic acid but also carmine which is the pigment (inclusive of its complexes and their polymers) formed as a metal ion, such as aluminum or calcium ion, is complexed with carminic acid. As the carmine, there can be mentioned such species as the complex of carminic acid with aluminum ion, inclusive of its polymer (aluminum lake), and the complex of carminic acid with calcium ion, inclusive of its polymer (calcium lake).

The cochineal color of the invention, as obtained in the above manner, can be formulated with a carrier and/or additive which is acceptable from food sanitation points of view or pharmaceutically acceptable and be provided in the form of a color composition. This color composition can be used with advantage for the colorant product to be added for the purpose of coloring foods inclusive of drinks, pharmaceutical products, quasi drugs or cosmetic products, particularly those products which are intended, or are liable, to be taken by mouth.

The dosage form of the colorant product is not particularly restricted but may be a solution or dispersion of the cochineal color in a medium such as water, an alcohol, e.g. ethanol, or a suitable other solvent (for example, propylene glycol, glycerol or the like) or a dry (solid) product as prepared by formulating the cochineal color in a carrier (excipient) such as dextrin, lactose, dried starch syrup or the like and molding the mixture into powders, granules, tablets or pills.

The additives which can be formulated in the colorant product are not particularly restricted but include those food additives which are generally used in colors and colorant products, such as preservatives (sodium acetate, protamine, etc.), stabilizers (gum arabic, gellan gum, carrageenin, trehalose, water-soluble hemicellulose, sodium phosphate, sodium metaphosphate, etc.), emulsifiers (lecithin, sucrose fatty acid esters, polyglycerol fatty acid esters, etc.), antioxidant (tea extract, raw coffee extract, sunflower seed extract, myrica extract, rutin extract, rosemary extract, enzymatically treated rutin, decomposition product of rutin (quercetin), enzymatically treated isoquercitrin, tocopherols, ascorbic acid compounds, etc.).

As shown in Example 3 given below, the cochineal color significantly deodorized can be prepared by the process of the invention. The process for producing a cochineal color of the invention may be understood as a process for deodorizing a cochineal color. Thus, the invention includes the following modes.

(a). A process for deodorizing a cochineal color which comprises subjecting a cochineal extract solution to proteolysis and removing a fraction of molecular weight not less than 6000.

(b). A process for deodorizing a cochineal color which comprises subjecting the cochineal extract solution to proteolysis and then to at least one treatment selected from the group consisting of adsorption treatment, ion exchange treatment, acid treatment and membrane treatment.

(c). A process for deodorizing a cochineal color which comprises subjecting the cochineal extract solution to proteolysis and adsorption and then to at least one treatment selected from the group consisting of adsorption treatment, ion exchange treatment, acid treatment and membrane treatment.

(d). A process for deodorizing a cochineal color as defined in paragraph (a) wherein the cochineal extract solution is an extracted product obtained from the *Coccus cactus* L. insect with use of an aqueous alcohol.

(e). A process for deodorizing a cochineal color as defined in paragraph (a) wherein the cochineal extract solution is subjected to proteolysis under an acidic condition.

(f). A process for deodorizing a cochineal color as defined in paragraph (b) or (c) wherein the adsorption treatment is carried out under an acidic condition.

(g). A process for deodorizing a cochineal color as defined in paragraph (b) or (c) wherein the adsorption treatment comprises adsorbing cochineal color on an adsorbent under an acidic condition and desorbing it with an aqueous alcohol under a condition of pH 7~9.

(h). A process for deodorizing a cochineal color as defined in paragraph (b) or (c) wherein the acid treatment is conducted with an acid used as a food additive.

(i). A process for deodorizing a cochineal color as defined in paragraph (b) or (c) wherein the membrane treatment is at least one treatment selected from the group consisting of reverse osmosis membrane treatment, membrane filter treatment, ultrafiltration membrane treatment and nanofiltration membrane treatment.

(j). A process for deodorizing a cochineal color as defined in paragraph (b) or (c) wherein the membrane treatment is carried out using a membrane having a cut-off molecular weight of 2000~8000.

(k). A process for deodorizing a cochineal color as defined in paragraph (b) or (c) wherein a fraction of molecular weight not less than 6000 is removed by the membrane treatment.

EXAMPLES

The following examples illustrate the invention in further detail. It should, however, be understood that the scope of the invention is by no means defined by these examples.

Example 1

(1) Preparation of Cochineal Color and a Colorant Product

To 35 kg of the dry powder of the insect *Coccus cacti* L. was added 800 L of water adjusted to pH 7.5 with sodium hydroxide and the cochineal color was extracted at 90~100° C. with stirring for 20~30 minutes. The extract solution was passed through a 60-mesh metal sieve for solid-liquid separation and the liquid phase (cochineal extract solution) was adjusted to pH 4 with citric acid and cooled to about 50° C. At this stage, 0.1% of protease was added and the mixture was stirred at that temperature for 3 hours. Then, the protein hydrolysate obtained was adjusted to pH 3 with citric acid, mixed with the filter aid and diatomaceous earth, and filtered through filter paper to recover about 250 L of the protein hydrolysate. This cochineal protein hydrolysate was run onto a column packed with the adsorbent resin Amberlite XAD-7 (150 L) to adsorb cochineal color. After the resin column was washed with 8 volumes of water, the cochineal color was eluted out with 130 L of 50% aqueous solution of ethanol (pH 7.5) to collect 82 L of eluate. Then, this adsorption-treated fluid was treated with an MF membrane (a ceramic filter, 0.2 μm; NGK Insulators) at 2 kg/cm$^2$ and 20° C. to recover 82 L of MF filtrate.

Further, a treatment using an NF membrane (CF30-S, cut-off mol. wt.=6000; Nitto Denko) was carried out at 3 kg/cm$^2$ and 20° C. to give 80 L of NF filtrate. This NF filtrate was concentrated under reduced pressure to give 20 kg of a significantly purified color solution with a color value of $E^{10\%}_{1\,cm}$=200. To 20 kg of this color solution were added 32.4 kg of water, 13 kg of ethyl alcohol and 600 g of citric acid (crystals) to give 66 kg of a cochineal colorant product with a color value of $E^{10\%}_{1\,cm}$=60.

The color value ($E^{10\%}_{1\,cm}$) mentioned above is a value found by measuring the absorbance of a solution of the objective cochineal color (0.1 N HCl) at the maximum absorption wavelength (ca 410 nm) in the visible region of the spectrum and converting the absorbance value to the absorbance of a 10 w/v % solution.

(2) Analysis by SDS-Polyacrylamide Gel Electrophoresis (SDS-PAGE)

If the treated solution obtained in each production stage (cochineal extract solution, protein hydrolysate, adsorption-treated solution, MF filtrate or NF filtrate) is directly electrophoresed, a protein analysis can hardly be made owing to the influence of pigments, salts, etc. occurring in the cochineal color. Therefore, using a liquid chromatograph, the protein alone was selectively separated from each treated solution and analyzed by electrophoresis. Thus, 5 µl of each solution with a color value of $E^{10\%}{}_{1\ cm}=80$ was run onto a Symmetry C18: ODS column (ø 0.46 mm×250 mm) under the conditions of developer solvent: 70% MeOH, flow rate: 1 ml/min. and detection wavelength: 280 nm to separate pigments and salts from the protein and the protein fraction alone was harvested. This treatment was repeated 10 times and the protein fractions were pooled, concentrated to dryness, dissolved in 100 µl of water to prepare a sample and subjected to electrophoresis. The electrophoresis was performed according to the Laemmli method (Nature, 227, 680 (1970)) and the gel was silver-stained in the routine manner. The sample for electrophoresis was prepared by mixing 105 µl of the above sample with 10 µl of 2-mercaptoethanol, 25 µl of 0.5 M Tris-HCl (pH 6.8), 40 µl of 10 wt. % SDS and 20 µl of 70 wt. % glycerin and boiling the mixture for 3 minutes.

The conditions of SDS-PAGE were as follows.
Sample for assay: 10 µl/lane
Buffer: Tris-glycine (pH 6.8), 0.1% SDS The results of electrophoresis are shown in FIG. 1. In FIG. 1, the lanes from left to right represent ① Molecular weight markers (16950Da, 14410Da, 10704Da, 8167Da, 6217Da, 2512Da), ② cochineal extract solution, ③ protein hydrolysate, ④ adsorption-treated solution, ⑤ MF filtrate, and ⑥ NF filtrate.

Recently, M. T. Lizaso et al. have reported that the allergens occurring in the cochineal color are proteins with molecular weights of 17000, 28000 and 50000 (*Ann Allergy Asthma*, Vol. 84(5), 549–552 (2000)). While it is generally acknowledged that proteins inducing allergic responses are comparatively large proteins with molecular weights over 10000, it has also been reported that a protein may become an allergen on coupling to another component.

If only from the results shown in FIG. 1, it is apparent that, in accordance with the production technology of the invention, not only said proteins having molecular weights of 17000, 28000 and 50000 but also proteins having molecular weights of 6000 and up, which are potential allergens, can be eliminated to the extent not detectable by silver staining (below about 100 ppb) any longer. Furthermore, by the production technology of the invention, the sample after NF treatment is already so pure that substantially no protein can be detected therein, indicating that the cochineal color with an extremely high safety rating can be obtained.

Example 2

To 24 kg of the cochineal colorant product with a color value of $E^{10\%}{}_{1\ cm}=60$ as prepared in Example 1 was added 156 kg of water, and 8 kg of tartaric acid, 9.3 kg of burnt alum and 0.6 kg of slaked lime (calcium hydroxide) were dissolved in the resulting color liquor (pigment solution). Then, under stirring, the temperature was raised to 80° C. and held at this level for 5 hours, whereby a water-insoluble cochineal aluminum lake (carmine) was obtained. This aqueous suspension of carmine was filtered with a filter press (Yabuta Co.) to recover a carmine cake, which was then dried in vacuo at 50° C. and crushed to prepare a carmine powder.

Protein analysis of this carmine by the same method of electrophoresis as in Example 1 showed no evidence of protein. It was, therefore, clear that a carmine substantially free of proteins as potential allergens can be prepared by the method described in Example 1.

In this connection, according to the findings obtained by the inventor of the present invention, when a carminic acid aluminum lake or calcium lake (carmine) is caused to form a polymer, there is the tendency that when a low molecular protein is allowed to be present, a more neat lake can be obtained with an increased intensity of red color. Therefore, a cochineal color (carmine) with a higher intensity of redness and an increase market value may be prepared by adding a protein of comparatively low molecular weight which does not become an allergen to the above allergen-free color solution.

Example 3

The cochineal colorant product with a color value of $E^{10\%}{}_{1\ cm}=60$ prepared in Example 1 was examined for the presence of an odor. More specifically, 5 g of the cochineal color product was diluted with water to thereby prepare 1 L of a solution with a color value of $E^{10\%}{}_{1\ cm}=0.3$. The resulting solution was heated to the temperature of 50° C. and then evaluated for its odor based on the judgments made by a panel of 10 highly-trained specialists. As a comparative sample for the evaluation were used a cochineal extract (pH 7.5) obtained from the dry powder of the insect *Coccus cacti* L. by a water extraction following the procedures of Example 1 (comparative color 1) and a cochineal color prepared by further subjecting the cochineal extract obtained by the water extraction to resin adsorption treatment (comparative color 2). The comparative samples were used for the evaluation of odors after diluted in the same manner as described above to prepare a solution with a color value of $E^{10\%}{}_{1\ cm}=0.3$ and then heated to the temperature of 50° C. The results are shown in Table 1.

TABLE 1

| Evaluation | Purified cochineal color product | Comparative color 1 | Comparative color 2 |
|---|---|---|---|
| +++ | 0 | 7 | 3 |
| ++ | 0 | 3 | 6 |
| + | 0 | 0 | 1 |
| ± | 2 | 0 | 0 |
| − | 8 | 0 | 0 |

(Each number in Table 1 shows the number of panelists who selected the grades according to the below "Evaluation Criteria".)
<Evaluation Criteria>
+++: An odor derived from the insect *Coccus cacti* L. is strongly perceived.
++: An odor derived from the insect *Coccus cacti* L. is perceived.
+: An odor derived from the insect *Coccus cacti* L. is faintly perceived.
±: An odor derived from the insect *Coccus cacti* L. is hardly perceived.
−: An odor derived from the insect *Coccus cacti* L. is not perceived.

As is apparent from the results, the cochineal color of the invention is odorless or odorous in a degree hardly perceivable, and the cochineal color significantly deodorized can be prepared by the process of the invention.

Example 4

The cochineal colorant product with a color value of $E^{10\%}{}_{1\ cm}=60$ prepared in Example 1 was examined for the formation of sediment with time. Specifically, the cochineal colorant product was preserved in dissolved state at the temperature of 5° C. for six months and then visually observed for the sedimentation. As the result, the colorant product of the invention formed no sediment and was stable for a long period.

The result shows that the cochineal color significantly inhibited from settling during a long-term storage can be prepared by the process of the invention.

INDUSTRIAL APPLICABILITY

The cochineal color according to this invention is a substantially allergen-free, safe color which has been highly purified to remove the protein and other contaminants derived from the raw material *Coccus cacti* L. insect. Therefore, this color and the colorant product containing the color according to the invention can be used without fear of risks for allergic responses as the coloring matter for products which are, or are liable to be, taken by mouth, such as beverages and other foods, pharmaceutical products, quasi drugs and cosmetic products.

Further, the cochineal color of the invention is significantly deodorized to a degree hardly perceivable, so that the color can be used for coloring products such as foods, cosmetics, etc. of which commercial values are influenced by their odor.

Furthermore, the cochineal color according to the invention is least liable to form a precipitate with time so that it can evenly color various products, such as drinks, foods including confectionery, etc. without the need for filtration in advance of use.

The invention claimed is:

1. A process for producing a cochineal color which comprises subjecting a cochineal solution extracted from *Coccus cacti* L. insect bodies to proteolysis and removing a fraction of molecular weight not less than 6000 by membrane treatment.

2. A process for producing a cochineal color as claimed in claim 1 wherein the cochineal solution extracted from *Coccus cacti* L. insect bodies is an extracted product obtained by extracting *Coccus cacti* L. insect bodies with use of an aqueous alcohol.

3. A process for producing a cochineal color as claimed in claim 1 wherein the cochineal solution extracted from *Coccus cacti* L. insect bodies is subjected to proteolysis under an acidic condition.

4. A process according to claim 1 for producing a cochineal color wherein the color is odorous in a hardly perceptible way.

5. A process for producing a cochineal color as claimed in claim 1 further comprising at least one treatment selected from the group consisting of adsorption treatment, ion exchange treatment and acid treatment.

6. A process for producing a cochineal color as claimed in claim 5 wherein the adsorption treatment is carried out under an acidic condition.

7. A process for producing a cochineal color as claimed in claim 5 wherein the adsorption treatment comprises causing a cochineal color to be adsorbed on an adsorbent under an acidic condition and, then, desorbed with an aqueous alcohol under a condition of pH 7 to 9.

8. A process for producing a cochineal color as claimed in claim 5 wherein the acid treatment is conducted with an acid used as a food additive.

9. A process for producing a cochineal color as claimed in claim 1 wherein the membrane treatment is at least one treatment selected from the group consisting of reverse osmosis membrane treatment, membrane filter treatment, ultrafiltration membrane treatment and nanofiltration membrane treatment.

10. A process for producing a cochineal color as claimed in claim 1 wherein the membrane treatment is a treatment using a membrane having a cut-off molecular weight of 2000 to 8000.

* * * * *